(12) United States Patent
Rousu et al.

(10) Patent No.: US 7,796,560 B2
(45) Date of Patent: Sep. 14, 2010

(54) PERFORMANCE OF A RECEIVER IN INTERFERING CONDITIONS

(75) Inventors: Seppo Rousu, Oulu (FI); Marko Leinonen, Oulu (FI)

(73) Assignee: Nokia Corporation, Espoo (FI)

( * ) Notice: Subject to any disclaimer, the term of this patent is extended or adjusted under 35 U.S.C. 154(b) by 1096 days.

(21) Appl. No.: 10/559,896

(22) PCT Filed: Jun. 10, 2003

(86) PCT No.: PCT/IB03/02176

§ 371 (c)(1), (2), (4) Date: Dec. 7, 2005

(87) PCT Pub. No.: WO2004/110088

PCT Pub. Date: Dec. 16, 2004

(65) Prior Publication Data

US 2006/0209779 A1    Sep. 21, 2006

(51) Int. Cl.
- *H04W 4/00* (2009.01)
- *H04J 1/00* (2006.01)
- *H03D 1/04* (2006.01)
- *G01S 1/00* (2006.01)

(52) U.S. Cl. .......... 370/333; 370/343; 370/480; 375/346; 342/357.1

(58) Field of Classification Search ......... 370/333, 370/343, 480; 342/357.1; 375/346
See application file for complete search history.

(56) References Cited

U.S. PATENT DOCUMENTS

| | | | |
|---|---|---|---|
| 6,107,960 A | 8/2000 | Krasner | 342/357.09 |
| 6,278,723 B1 | 8/2001 | Meihofer et al. | |
| 6,961,019 B1 * | 11/2005 | McConnell et al. | 342/357.1 |
| 7,010,270 B1 * | 3/2006 | Thomas et al. | 455/67.13 |
| 2002/0061080 A1 * | 5/2002 | Richards et al. | 375/346 |
| 2002/0086708 A1 * | 7/2002 | Teo et al. | 455/561 |
| 2003/0063597 A1 * | 4/2003 | Suzuki | 370/347 |
| 2004/0266342 A1 | 12/2004 | Kontola et al. | 455/12.1 |

FOREIGN PATENT DOCUMENTS

WO    WO 01/06669    1/2001

OTHER PUBLICATIONS

Korean Office Action (translation only) for corresponding Korean Patent Application No. 10-2005-70233456.
"Neue DVB-T-GPRS-Multimediadienste", Calda et al., Grundlagen, XP-000942052, pp. 48-51.

(Continued)

*Primary Examiner*—Vincent P Harper
*Assistant Examiner*—Timothy Pham

(57) ABSTRACT

A device 22 includes a communication system transceiver 40 for exchanging signals in a first frequency band and a receiver 30 for receiving signals in a second frequency band. In order to improve the performance of the receiver. A processing portion 34 of the devices detects the presence of signals interfering with the signals in the second frequency band and also determines a timing pattern for interfering signals based on a timing information which is indicative of the timing for transmissions employed by the transceiver 40. A manipulation of signals reaching the receiver 30 during intervals defined by the determined timing pattern is then done, in order to reduce a performance degradation due to interfering signals originating from a transmitter 21 employing the same timing for transmissions as the transceiver 40. A corresponding method is also disclosed.

20 Claims, 7 Drawing Sheets

OTHER PUBLICATIONS

"Galileo, The European Programme for Global Navigation Services", ESA Publications Division, ESTEC, May 2002.
Benedicto et al, Galileo: Satellite System Design and Technology Developments, European Space Agency, Nov. 2000 (21 pages).
Hein et al; The Galileo Frequency Structure and Signal Design, Galileo Signal Task Force of the European Commission, Brussels, Sep. 2002 (12 pages).

Kees de Jong, Future GPS and Galileo Signals, Unprecented Accuracy and Availability, Geoinformatics, Jun. 1999 (2 pages).
Hein et al; Status of Galileo Frequency and Signal Design, Galileo Singla Task Force of the European Commission, Brussels, Dec. 14-15, 2001 (13 pages).

* cited by examiner

PERFORMANCE OF A RECEIVER IN INTERFERING CONDITIONS

CROSS-REFERENCE TO RELATED APPLICATION

This application is the U.S. National Stage of International Application Number PCT/IB2003/002176 filed Jun. 10, 2003 and published in English on Dec. 16, 2004 under International Publication Number WO 2004/110088 A1 with International Search Report.

FIELD OF THE INVENTION

The invention relates to a device comprising a communication system transceiver for exchanging, signals in a communication system via a radio interface in a first frequency band and a receiver for receiving signals via a radio interface in a second frequency band. The invention relates equally to a method for improving the performance of such a receiver.

BACKGROUND OF THE INVENTION

Devices comprising a communication system transceiver are known from the state of the art, for example for enabling a GSM (Global System for Mobile communications), a US-TDMA (US Time Division Multiple Access or IS-136), a CDMA (Code Division Multiple Access) or a WCDMA (Wideband CDMA) communication of the device via some communication network. Further, a receiver operating at a different frequency band than such a communication system can be for example a satellite positioning system receiver, like a GPS (Global Positioning System) receiver of a GPS system or a DVB-T (Digital Video Broadcast-Terrestrial) receiver of a DVB-T system. A communication system transceiver operating at a first frequency band and a receiver operating at a second frequency band can also be implemented together in a single device, for instance in a mobile phone, in a PC (personal computer) or in a laptop.

The performance of the receiver may be degraded, however, during time intervals in which wideband noise in the second frequency band reaches the receiver, since this wideband noise may reduce the signal-to-noise ratio (SNR) of the received signals significantly.

The wideband noise can be generated in particular by a communication system transceiver integrated in the same device as the receiver, or by a communication system transceiver external to this device.

In a GPS system, for example, several GPS satellites that orbit the earth transmit signals which are received and evaluated by GPS receivers. All GPS satellites use the same two carrier frequencies L1 and L2 of 1575.42 MHz and 1227.60 MHz, respectively. The modulation of these carrier frequencies L1 and L2 is illustrated in FIG. 1. After a phase shift of 90 degrees, the sinusoidal L1 carrier signal is BPSK (bi-phase shift key) modulated by each satellite with a different C/A (Coarse Acquisition) code known at the receivers. Thus, different channels are obtained for the transmission by the different satellites. The C/A code, which is spreading the spectrum over a 1.023 MHz bandwidth, is a pseudorandom noise sequence which is repeated every 1023 chips, the epoch of the code being 1 ms. The term chips is used to distinguish the bits of a modulation code from data bits. In parallel, the L1 carrier signal is BPSK modulated after an attenuation by 3 dB with a P-code (Precision code), and the L2 carrier signal is BPSK modulated with the same P-code before an attenuation by 6 dB. Before transmission, the two differently modulated parts of the L1 carrier signal are summed again. The L2 carrier signal carries currently only the P-code. The P-code is much longer than the C/A code; Its chip rate is 10.23 MHz and it repeats every 7 days. In addition, the P-code is currently encrypted, and for that reason it is often referred to as P(Y)-code. Decryption keys needed for using the P(Y)-code are classified and civil users cannot access them. Therefore, only the L1 carrier C/A code is usable in civil GPS receivers.

Before the C/A-code and the P(Y)-code are modulated onto the L1 signal and the L2 signal, navigation data bits are added to the C/A- and P(Y)-codes by using a modulo-2 addition with a bit rate of 50 bits/s. The navigation information, which constitutes a data sequence, can be evaluated for example for determining the position of the respective receiver. The L1 signal which is received at a receiver is further modulated due to the Doppler effect and possibly due other higher order dynamic stresses.

The reception bandwidth of a GPS receiver receiving the modulated satellite signals is related to the reception code. For example, if GPS is based on the L1 carrier C/A code, then the signal requires a frequency band of 1575.42 MHz+/−5 MHz. If a P-code capable receiver is used, then the reception band of the GPS receiver is much wider, it is likely to be 1575.42 MHz+/−24 MHz. The actual used GPS reception bandwidth is further related to the actual implementation, and thus the previously mentioned bandwidths are presented for demonstration purposes. The mentioned GPS bandwidth will thus be used in the following only by way of example.

The GPS standard is currently under modernization. One of the main components of the modernization consists in two new navigation signals that will be available for civil use in addition to the existing civilian service broadcast of the L1-C/A code at 1575.42 MHz.

The first one of these new signals will be a C/A code located at 1227.60 MHz, i.e. modulated onto the L2 carrier frequency, and will be available for general use in non-safety critical applications. The new civilian signal at L2, referred to as "L2CS", will generally be characterized by a 1.023 Mcps (mega chips per second) effective ranging code having a Time Division Multiplex of two ½ rate codes. The L2CS signal will be BPSK modulated onto the L2 carrier, along with the P(Y)-code. This C/A code will be available beginning with the initial GPS Block IIF satellite scheduled for launch in 2003.

The second one of the new signals will be using a third carrier frequency L5 located at 1176.45 MHz. The L5 carrier frequency will be modulated with C/A codes, more specifically with a CL code of 767,250 chips and a CM code of 10,230 chips. The L5 signal will provide a 10.23 Mcps ranging code, wherein it is expected that improved cross correlation properties will be realized. The L5 signal will be message based. It will include an I (In-phase) channel carrying 10-symbol Neumann/Hoffman encoding and a Q (Quadrature) channel carrying 20-symbol Neumann/Hoffman encoding. The I and Q channels will be orthogonally modulated onto the L5 carrier. The L5 signal falls into a frequency band which is protected worldwide for aeronautical radionavigation, and therefore it will be protected for safety-of-life applications. Additionally, it will not cause any interference to existing systems. Thus, with no modification of existing systems, the addition of the L5 signal will make GPS a more robust radionavigation service for many aviation applications, as well as for all ground-based users, like maritime, railways, surface, shipping, etc. The new L5 signal will be available on GPS Block IIF satellites scheduled for launch beginning in 2005.

At the current GPS satellite replenishment rate, all three civil signals, i.e. L1-C/A, L2-C/A and L5, will be available for initial operational capability by 2010, and for full operational, capability approximately by 2013.

Measurements show that if no measures are taken, the SNR of a GPS signal received by a GPS receiver degrades by about 2 dB in case a GSM transceiver implemented in the same device uses for transmissions a single slot TX (transmission) mode, and by about 3 dB in case the GSM transceiver implemented in the same device uses for transmissions a dual slot TX mode.

In particular communication systems operating in the 1900 band, like GSM1900, which are widely referred to as PCS (Personal Communication System), and communication systems operating in the 1800 band, like GSM1800, which are widely referred to as DCS (Digital Communication System), will generate wideband noise in this GPS L1 band of 1575.42 MHz+/−5 MHz, when C/A code supported GPS is used. When new L2 and L5 frequency GPS signals are used, then lower frequency GSM signals, i.e. GSM900 and GSM800, will generate the same wide band noise problem as GSM1800 to the L1 GPS signal.

The GPS receiver, however, requires a sufficient SNR of received satellite signals for being able to correctly acquire and track the signal based on its C/A code and thus to make use of its content. It is better for the performance of the GPS receiver to receive signals with a particularly low SNR than not to receive any signal at all during short time intervals.

Typically in spread spectrum systems, the AGC (Automatic Gain Control) tunes the received information signal level for A/D (analog to digital) conversion based on the noise level. In normal operation conditions, the noise is coming from background noise, which has a constant power level. The problem arises when the noise level rises rapidly and the AGC tries to adjust an incoming signal to a certain appropriate level for an A/D conversion. A fast varying high noise level can cause saturation in the A/D converter and the amplitude of the signal is clipped. If the signal is clipped in conversion, some information signal is lost and thus the receiver performance is degraded.

Also external interferences can block a GPS receiver operation completely, in case multiple communication system transceivers are transmitting in the same area at the same time.

For illustration, FIG. 2 shows a communication system with a base station 10 of a communication network, a first mobile station MS1 11 comprising a GSM transceiver and a second base station MS2 12 comprising a GSM transceiver and in addition a GPS receiver. The first and the second mobile station 11, 12 may exchange signals with the base station in uplink and downlink transmissions. During the uplink transmissions of either of the two mobile stations 11, 12, wideband noise is generated in the GPS frequency band, which may disturb the performance of the GPS receiver of the second mobile station 12. In order to notice a noise rise in the GPS receiver of the second mobile station 12 during a GSM transmission by the first mobile station 11, the first mobile station 11 has to be near to the second mobile station 12. This is due to the fact that the propagation loss, i.e. the attenuation on the air interface, is increased, when the distance between the transmitter and the receiver is increased.

The same problem as in the case of GPS may occur, for example, when a Galileo receiver is used instead of a GPS receiver. Galileo is a European satellite positioning system, for which the beginning of commercial operations is scheduled for 2008. Galileo comprises 30 satellites, which are distributed to three circular orbits to cover the entire surface of the Earth. The satellites will further be supported by a worldwide network of ground stations. It is planned that Galileo will provide ten navigation signals in Right Hand Circular Polarization (RHCP) in the frequency ranges 1164-1215 MHz, using carrier signals E5$a$ and E5$b$, 1215-1300 MHz, using a carrier signal E6, and 1559-1592 MHz, using a carrier signal E2-L1-E1. Similarly as with GPS, the carrier frequencies E5$a$, E5$b$, E6 and E2-L1-E1 will be modulated by each satellite with several PRN codes spreading the spectrum and with data. Thus, GSM transmitters may equally generate wideband interferences in frequency bands employed by Galileo.

Obviously, the performance of a receiver due to transmissions by a communication system transceiver may equally be degraded in a similar situation in case of another type of a communication system transceiver and/or another type of a receiver.

In U.S. Pat. No. 6,107,960, a method is proposed for reducing cross-interferences in a combined satellite positioning system receiver and communication system transceiver device. A control signal is transmitted from the communication system transceiver to the satellite positioning system receiver, when the communication transceiver transmits data over a communication link. The control signal causes the satellite positioning system signals from satellites to be blocked from the receiving circuits of the satellite positioning system receiver, or to be disregarded by the processing circuits of the satellite positioning system receiver. In case the of a GSM transceiver using a single slot TX mode, the resulting performance degradation is always 0.6 dB=(10*log 10(⅛).

This method is only able to improve the performance of the satellite positioning system receiver, however, if the interfering signals are generated by a communication system transmitter integrated in the same device as the satellite positioning system receiver.

A similar performance degradation as in a satellite positioning receiver system may occur as well in a DVB-T receiver system.

DVB-T was first adopted as a standard in 1997, and is currently rapidly expanding in Europe, Australia and Asia. DVB-T offers about 24 Mbit/s data transfer capability to a fixed receiver, and about 12 Mbit/s to a mobile receiver using an omnidirectional antenna. Some distinguishing technical features of DVB-T include the following: DVB-T offers a net bit rate (R) per frequency channel in the range of about 4.98 to 31.67 Mbit/s and operates with a channel separation of 8 MHz in the UHF range of 470-862 MHz. In the VHF range of 174-216 MHz, the channel separation is 7 MHz. Single frequency networks can be used. DVB-T uses a Coded Orthogonal Frequency Division Multiplex (COFDM) multi-carrier technique with QAM (Quadrature Amplitude Modulation), 16 QAM or 64 QAM carrier modulation. The number of sub-carriers can be between 1705 (2 k) to 6817 (8 k). An inner forward error correction coding (FEC) uses convolutional coding with rates of ½, ⅔, ¾, ⅚ or ⅞, while an outer coding scheme uses Reed-Solomon (204,188,t-8) coding. Outer bit-interleaving uses convolutional interleaving of depth 0.6-3.5 ms. For 8 k mode, the duration of the symbol part is 896 micro seconds and for 2 k mode 224 micro seconds. The actually seen DVB-T symbol length is the symbol duration and a guard time which can be ¼, ⅛, 1/16 or 1/32. DVB-T was developed for MPEG-2 Transport stream distribution, but it is capable as well of carrying other types of data. For example, DVB-T can provide a broadband, mobile wireless data transport for video, audio, data and Internet Protocol (IP) data.

DVB-T is scalable, with cells sizes ranging from, for example, 100 km down to picocells of e.g. tens to hundreds of meters. The capacity is very large. For example, 54 channels can be supported, each running at 5-32 Mbit/s. One time slot packet is 188 (204) bytes long. Due to the large number of sub-carriers, the symbol time can be made very long. For example, for the 8 k sub-carrier case, the symbol time is on the order of 1 millisecond. A guard interval is inserted before each symbol.

Thus, while DVB-T is well suited for providing digital video streams, DVB-T can be used as well to provide high speed data streams for other types of applications, such as interactive services, Internet access, gaming and e-commerce services. As can be appreciated, for interactive and other services to be provided, a return link or channel is required from the user back to some server or other controller. One example of such as a system is MediaScreenJ by Nokia. This device provides an LCD display screen for displaying information received from a DVB-T downlink, and includes a GSM function having a transmitter to provide the return link or channel.

When using such a constellation, a problem arises because the lower end of the GSM transmission band begins at 880 MHz, while the upper end of the received DVB-T frequency band ends at 862 MHz in European channel allocation. Thus, transmitted energy from the GSM band can leak as wideband interference into the DVB-T receiver, resulting in errors in the processing of the received data.

It should be noted that while the foregoing presentation has concentrated on specific DVB-T frequencies and the European GSM system, the same problems can arise in other locations where DVB-T has been specified for use. For example, in the United States of America, digital television is referred to as ATSC (Advanced Television Systems Committee), and currently the FCC has allocated the frequency bands of 764-776 MHz and 794-806 MHz for Digital Television (DTV) broadcasts. One U.S. cellular transmission band, which is already occupied, has been established from 824-849 MHz. As can be noted, the upper boundary of the DTV band of 806 MHz is separated from the lower end of the cellular transmit band of 824 MHz by only 18 MHz, about the same separation that is seen in the DVB-T/GSM embodiment described above.

It has been proposed that when a DVB-T receiver and a GSM transmitter are combined in a single device, the GSM transmitter may notify the DVB-T receiver about its transmissions, and the DVB-T receiver integrates an incoming signal only when GSM transmission is not active. In a DVB-T system, the symbol length is long compared to the length of a GSM burst and thus multiple GSM bursts can occur during one DVB_T symbol time.

This approach is only suited to improve the performance of the DVB-T receiver, however, if the interfering signals are generated by a GSM transmitter integrated in the same device as the DVB-T receiver.

SUMMARY OF THE INVENTION

It is an object of the invention to improve the performance of a receiver.

It is in particular an object of the invention to reduce a degradation of the performance of a receiver, which is integrated in a single device with a communication system transceiver, due to interfering signals generated by other transceivers of the same communication system.

On the one hand, a device is proposed, which comprises a communication system transceiver for exchanging signals via a radio interface in a first frequency band and a receiver for receiving signals via a radio interface in a second frequency band. The proposed device further comprises a processing portion detecting the presence of interfering signals in the second frequency band. The proposed device comprises in addition a processing portion determining a timing pattern for detected interfering signals based on a timing information provided by the communication system transceiver. This timing information is indicative of the timing of transmissions employed by the communication system transceiver. Finally, the proposed device comprises a processing portion causing a manipulation of signals reaching the receiver during time intervals defined by a determined timing pattern, in order to reduce a performance degradation due to interfering signals originating from a transmitter employing the same timing for transmissions as the communication system transceiver of the device.

On the other hand, a method for improving the performance of a receiver is proposed. The receiver is combined in a single device with a communication system transceiver, which exchanges signals via a radio interface in a first frequency band, while the receiver receives signals via a radio interface in a second frequency band. The proposed method comprises detecting the presence of interfering signals in the second frequency band. The proposed method further comprises determining a timing pattern for detected interfering signals based on a timing information which is indicative of the timing of transmissions employed by the communication system transceiver. Finally, the proposed method comprises manipulating signals reaching the receiver during time intervals defined by the timing pattern, in order to reduce a performance degradation due to interfering signals originating from a transmitter employing the same timing for transmissions as the communication system transceiver of the device.

The invention proceeds from the consideration that in most cases, an external interference is generated by a transmitter of a communication system transceiver which is connected to the same base station as the communication system transceiver of the device itself and which is rather close to the communication system transceiver of the device itself. Thus, the interfering transmitter probably uses the same timing, including the same timing advance, for its transmissions as the communication system transceivers of the device. For example, if time slots are employed for transmissions in a communication system, these time slots will be synchronized among all communication system transceivers which are connected to the same base station. The communication system transceiver of the device is therefore able to provide an exact timing information, based on which a timing pattern can be determined for a detected interference. The timing pattern can then be used for an interference cancellation with an accurate timing. The interference cancellation is performed by any suitable manipulation of signals reaching the receiver.

It is to be noted that without an indication to the contrary, any reference to a receiver will relate to such a receiver operating at a different frequency band than the communication system.

It is an advantage of the invention that it allows to improve the performance of a receiver which is combined in a single device with a communication system transceiver.

The invention allows to eliminate or at least to reduce the performance degradation of such a receiver resulting from a cross-interference in the frequency band used by the signals which are to be processed by the receiver, even in case the interference is caused by a communication system transceiver external to the device.

The invention is suited for dealing with interfering signals caused by any transmitter which uses the same timing for transmissions as the communication system transceiver of the device.

Preferred embodiments of the invention become apparent from the dependent claims.

The proposed invention could also take care of the interference caused by transmissions of the communication system transceiver of the device itself. Advantageously, however, an interference caused by transmissions of the communication system transceiver of the device is taken care of separately. As the device knows the exact time intervals in which its communication system transceiver is transmitting, signals reaching the receiver can be manipulated in these time intervals to reduce a performance degradation without the necessity of determining first a timing pattern. Also the intensity of the interference can be taken into account in the manipulation without any measurements, since the power level of the transmitted signals, which is directly related to the resulting interference intensity, is known in the device.

The manipulation of the signals reaching the receiver can be realized in various ways, as well for external interferences generated by transceivers external to the device comprising the receiver as for internal interferences generated by the transceiver in the device comprising the receiver.

In a first possible approach, the manipulation is carried out as presented in the above cited document U.S. Pat. No. 6,107,960. That is, either the reception of signals is blocked when an interfering signal exists, e.g. by means of a switch, or received signals are disregarded in an evaluation when an interfering signal exists.

In case the interfering signal is caused by a GSM transceiver, the performance degradation which can be achieved with this first approach is 0.6 dB in case of a single slot TX mode and 1.2 dB in case of a two slot TX mode.

In a second, alternative approach, the frequency range in which the receiver is able to receive signals is detuned when an interfering signal exists, e.g. by detuning an antenna system employed for receiving the signals which are to be processed by the receiver.

In case the interfering signal is caused by a GSM transceiver, the performance degradation which can be achieved with this second approach is less than 0.6 dB in case of a single slot TX mode and less than 1.2 dB in case of a two slot TX mode.

In a third, preferred approach, however, signals received by the receiver are attenuated or attenuated with an increased attenuation when an interfering signal exists. Advantageously, the attenuation is moreover made variable. More specifically, the applied attenuation is advantageously set higher in case of higher interference levels and lower in case of lower interference levels. Thereby, the receiver is adaptable to the respective interference level.

In case the interfering signal is caused by a GSM transceiver, the performance degradation which can be achieved with an adaptive attenuation is 0 dB to 0.6 dB in case of a single slot TX mode and 0 dB to 1.2 dB in case of a two slot TX mode.

The third presented approach thus results in the best performance.

The manipulation by a signal attenuation can be realized with any suitable attenuating component, for instance with an external variable gain attenuator in the receiver chain of the receiver, or by means of an integrated AGC (automatic gain control) functionality in the receiver. In a GPS receiver, for example, such an AGC functionality is already build-in and would only have to be extended. Thus, the implementation using a variable attenuation is quite simple and requires at least in the case of a GPS receiver no additional components.

The required processing can be realized by a software, which may be implemented in an existing DSP (digital signal processor) of the receiver.

The presence of interfering signals can be recognized in particular either in the communication system transceiver or in the receiver. The processing portion recognizing the presence of interfering signals can thus form part of the communication system transceiver or of the receiver.

The invention can be employed in any device comprising a communication system transceiver and an additional receiver, e.g. in a mobile phone, a laptop, etc.

The communication system transceiver can be for example, though not exclusively, a GSM transceiver, a US-TDMA transceiver, a WCDMA-GSM transceiver or a CDMA transceiver.

The receiver can be any type of receiver which may suffer a performance degradation due to interfering signals of a communication system. The receiver can be for example a receiver for receiving satellite signals, like a GPS receiver or a Galileo receiver. The receiver can also be for example a DVB-T receiver.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
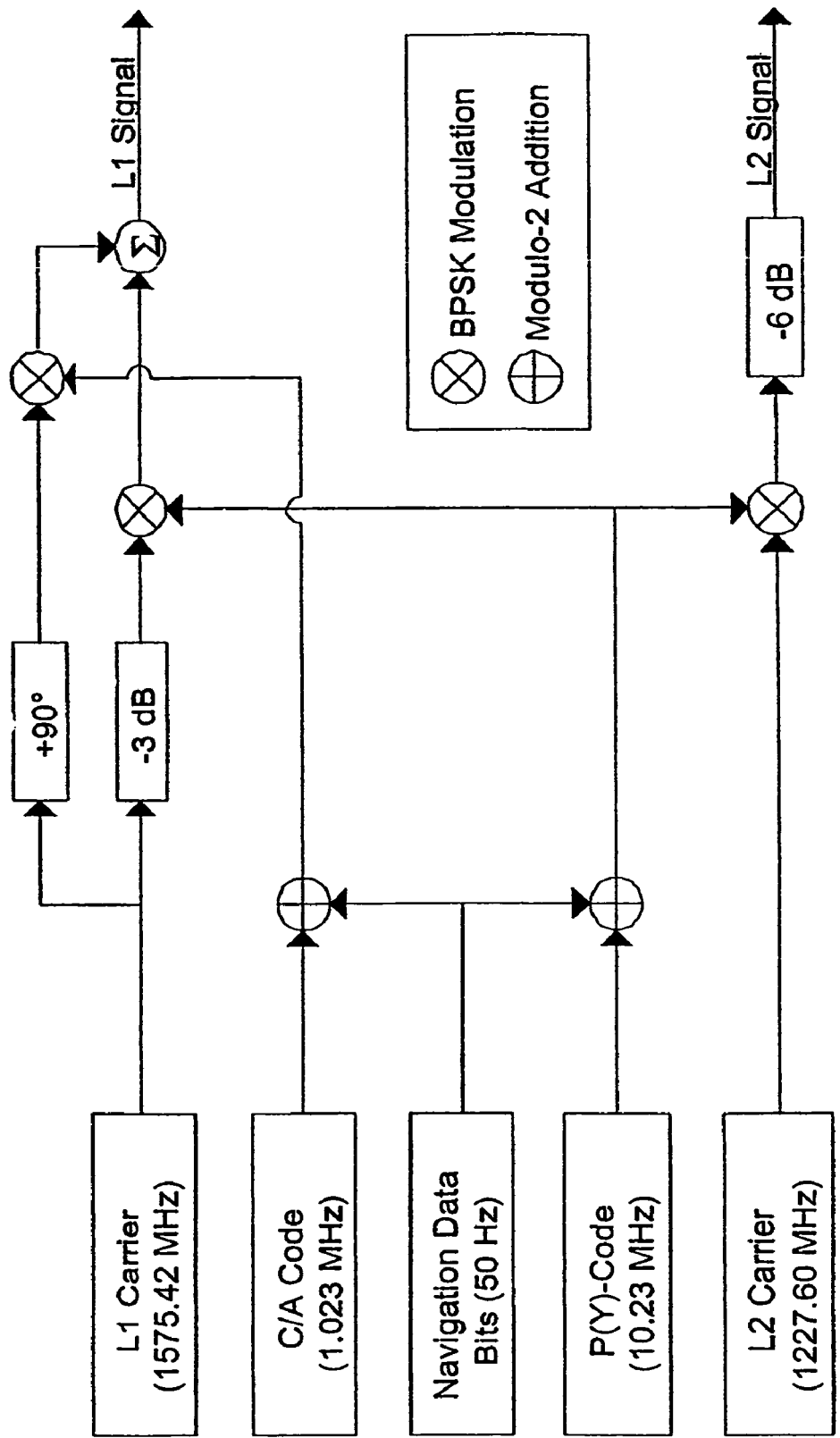
FIG. 1 illustrates the modulation of GPS carrier frequencies.
Figure 2:
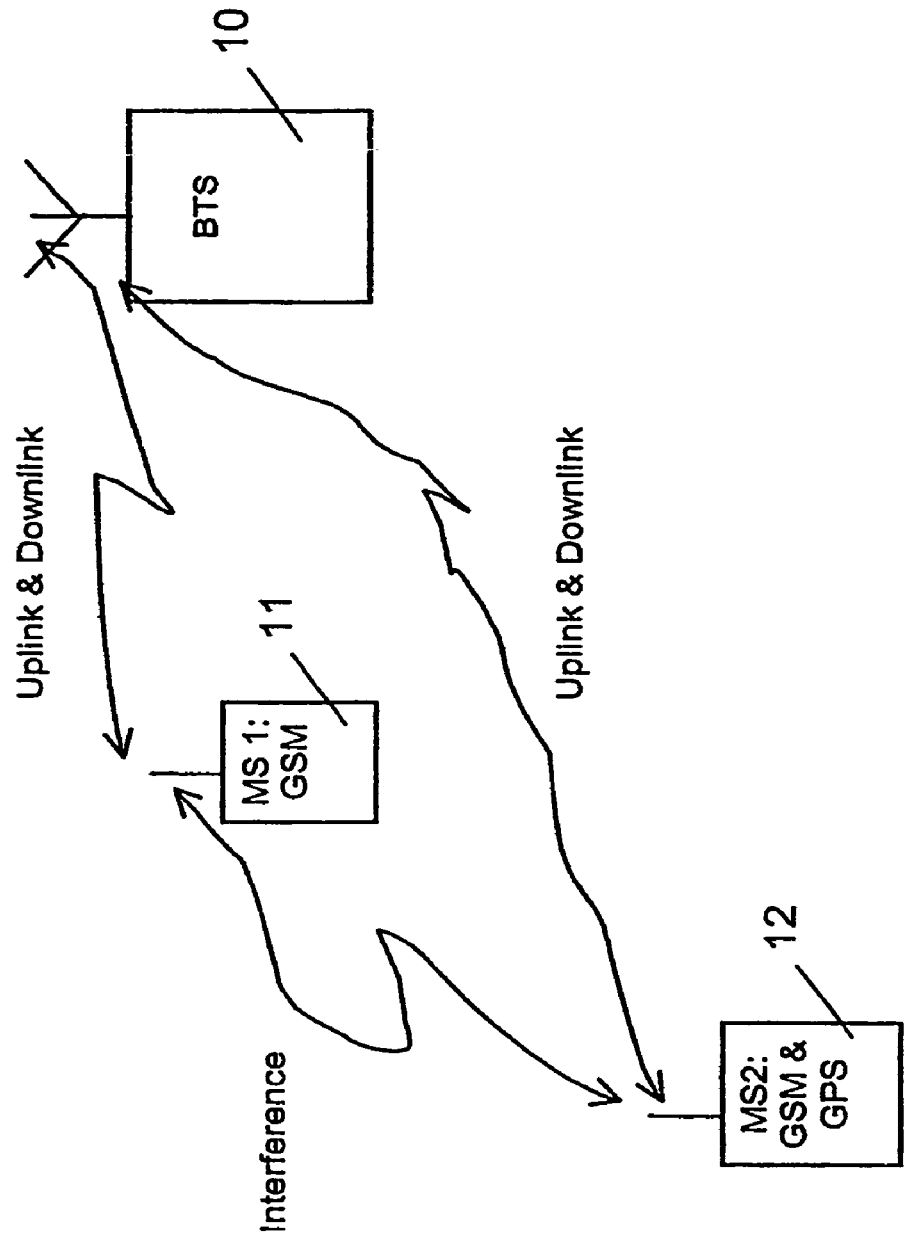
FIG. 2 shows a communication system in which a GPS receiver of a mobile station receives interfering signals from another mobile station.

The communication system presented in FIG. 1 and the situation shown in FIG. 2 have already been described above.

Figure 3:
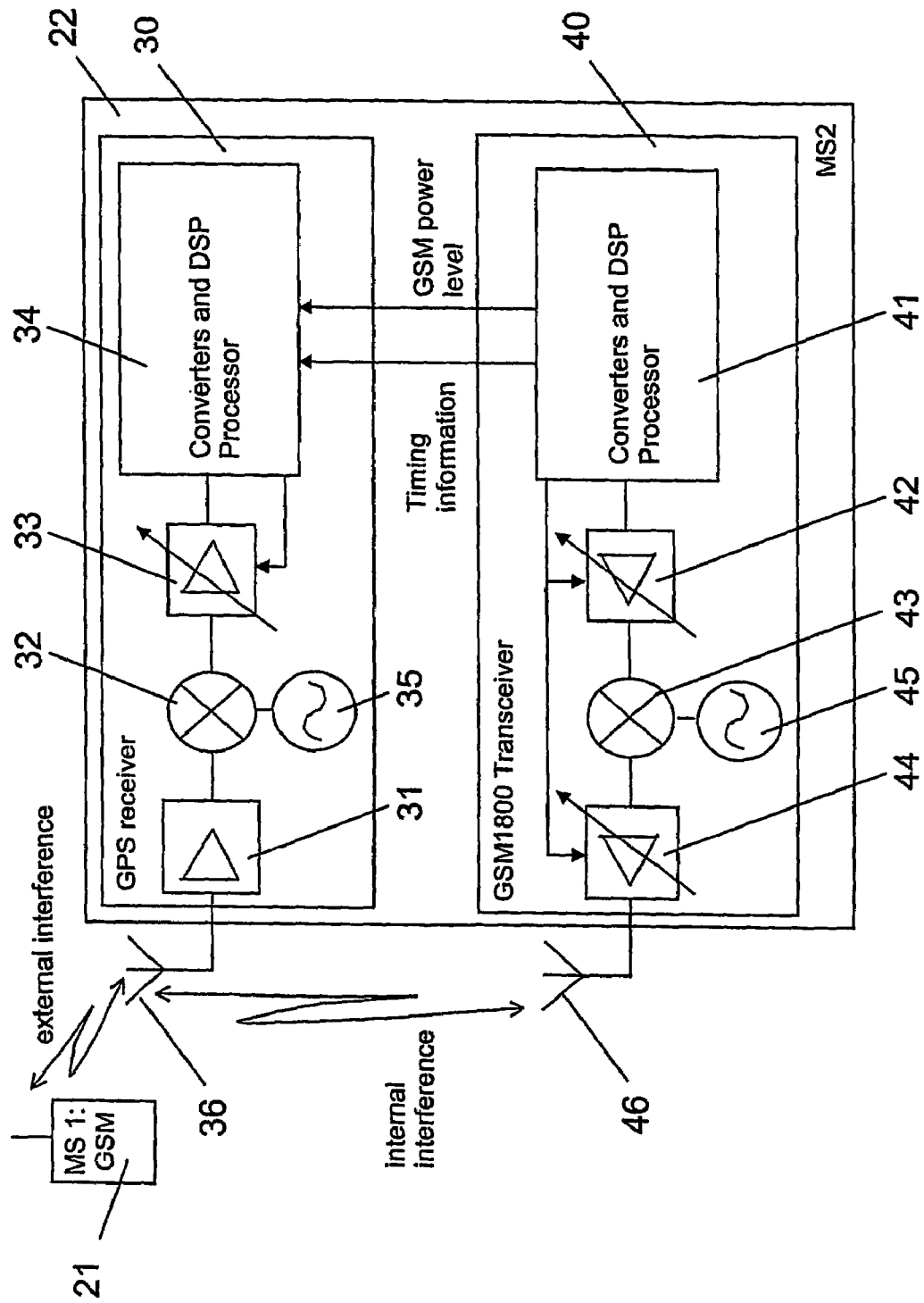
FIG. 3 is a block diagram of a mobile station which is designed according to the invention.

FIG. 3 is a schematic block diagram of a mobile station MS2 22 which supports a GPS positioning and a mobile communication via a GSM network, just like the second mobile station 12 of the communication system of FIG. 2. The mobile station 22 of FIG. 3, however, is designed according to the invention and supports thereby an improved interference cancellation.

Only selected components of the mobile station 22 are depicted.

For supporting a GPS positioning, the mobile'station 22 comprises a GPS receiver 30. The GPS receiver 30 includes, connected to each other in series, a low noise amplifier LNA 31, a mixer 32, a variable gain attenuator 33 and a converters and digital signal processor DSP (digital signal processor) processing block 34. The converters and DSP processing block 34 has in addition a controlling access to the variable gain attenuator 33. A local oscillator 35 is connected in addition to the mixer 32. The mobile station 22 further comprises a GPS antenna 36 which is connected to the low noise amplifier LNA 31 of the GPS receiver 30.

For supporting a mobile communication, the mobile station 22 comprises a GSM1800 transceiver 40, of which only a GSM transmitter chain is shown. The transmitter chain comprises, connected to each other in series, a converters and digital signal processor DSP (digital signal processor) processing block 41, a first variable power amplifier 42, a mixer 43 and a second variable power amplifier 44. The converters and DSP processing block 41 has in addition a controlling access to the variable power amplifiers 42 and 44. A local oscillator 45 is connected in addition to the mixer 43. The mobile station 22 further comprises a GSM antenna 46, which is connected to the second variable amplifier 44.

The converters and DSP processing block 41 of the GSM transceiver 40 is connected to the converters and DSP processing block 34 of the GPS receiver 30.

FIG. 3 shows in addition a further mobile station MS1 21, corresponding to the first mobile station 11 of FIG. 2, which may generate an external interference to the GPS receiver 30 of mobile station 22 when transmitting. The further mobile station 21 is assumed to be connected to the same base station of a communication network as mobile station 22 and to be located at a distance of less than 10 m from mobile station 22.

A radio frequency signal received via the GPS antenna 36 is processed by the GPS receiver 30. More specifically, it is amplified by the LNA 31, mixed by the mixer 32 with a signal provided by the local oscillator 35 for a down-conversion to the base band, attenuated by the variable gain attenuator 33 with a currently set gain, and then processed in a conventional way in the converters and DSP processing block 34. The processing in the converters and DSP processing block 34 may comprise for instance determining and tracking a C/A code in the signal, decoding a navigation information comprised in the tracked signal and performing positioning calculations for determining the current position of the mobile station 22.

A signal, which is to be transmitted by the GSM transceiver 40 in the scope of a mobile communication to a base station, is processed for transmission in a conventional way by the GSM transmitter chain. The signal is provided by the converters and DSP processing block 41 to the first variable power amplifier 42, which amplifies the signal with a currently set amplification factor. The amplified signal is then mixed by the mixer 43 with a signal provided by the local oscillator 45 for an up-conversion to a radio frequency signal having a carrier frequency in the range of 1710-1785 Mz. The radio frequency signal is further amplified by the second variable power amplifier 44 with a currently set amplification factor. The amplification factors are set by an AGC according to a request by the base station of a communication network to which the mobile station 22 is connected. The signal output by the second variable power amplifier 44 is then transmitted via the GSM antenna 46, causing wideband noise in the GPS band of 1575.42 MHz+/−5 MHz. This wideband noise is superimposed on any satellite signal reaching the GPS antenna 36.

In a similar way, the other mobile station 21 generates and transmits radio frequency signals for mobile communications, thereby causing wideband noise in the GPS band of 1575.42 MHz+/−5 MHz, which is equally superimposed on any satellite signal reaching the GPS antenna 36 of mobile station 22.

The performance of the GPS receiver 30 of mobile station 22 may be degraded by wideband noise generated by the GSM transceiver 40 of mobile station 22 or by the other mobile station 21.

Figure 4:
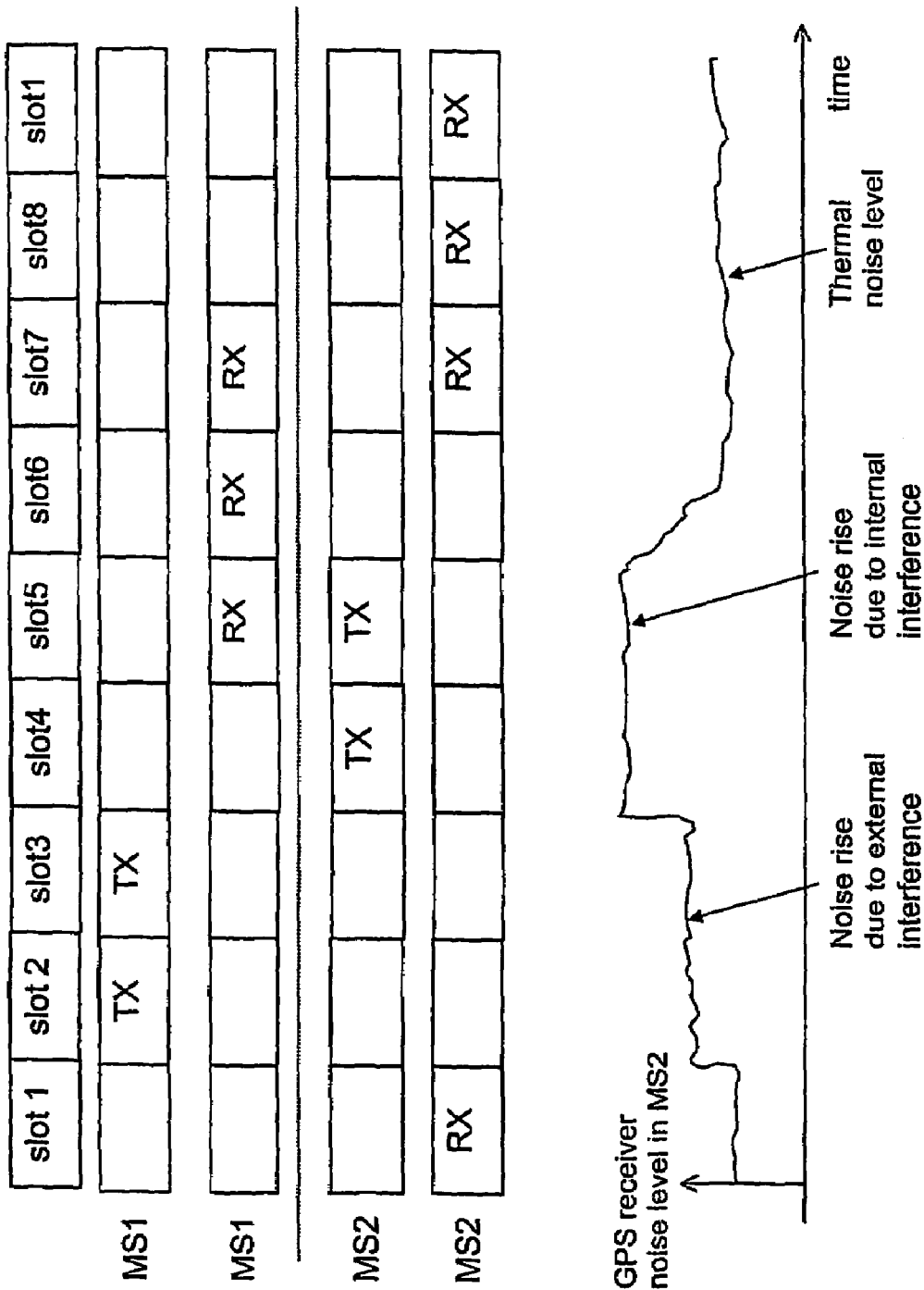
FIG. 4 illustrates a multislot operation in a communication system and a resulting noise level at a GPS receiver.

A possible development of the wideband noise reaching the GPS receiver 30 over time is depicted in FIG. 4.

FIG. 4 presents an exemplary use of time slots by the mobile stations MS1 21 and MS2 22 for transmissions and receptions. Both mobile stations employ multislot class 10, i.e. they can use three reception time slots and two transmission time slots in eight consecutive time slots. The two mobile stations 21, 22 use different radio frequency channels in the GSM frequency band.

A first row presents the numbering of time slots in a sequence of nine time slots, slot 1 to slot 8 and slot 9. As indicated in a second row, mobile station 21 employs time slots 2 and 3 for transmissions. As indicated in a third row, mobile station 21 employs time slots 5, 6 and 7 for receptions. As indicated in a fourth row, mobile station 22 employs time slots 4 and 5 for transmissions. As indicated in a fifth row, mobile station 22 employs time slots 7, 8 and 1 for reception.

Below the sequences of time slots, a diagram depicts the noise level in the GPS frequency band reaching the GPS antenna 36 of mobile station 22 over time. As can be seen, during the first time slot, there is only the thermal noise level, as none of the mobile stations 21, 22 is transmitting signals and thus none of the mobile stations 21, 22 is generating wideband noise in the GPS frequency band. During the second and the third time slot, the noise level rises due to an interference generated by mobile station 21. The noise level in the GPS receiver 30 depends on the GSM transmitter power requested by the base station from mobile station 21 and on the antenna isolation from the GPS receiver 30 to the mobile station 21 During the fourth and fifth time slot, the noise level rises further, due to an interference generated by mobile station 22. The noise level in the GPS receiver 30 depends now on the GSM transmitter power requested by the base station from mobile station 22. The interference generated by mobile station 22 itself is seen at a higher level than external interferences. After the fifth time slot, the noise level decreases again to the thermal noise level, as none of the mobile stations 21, 22 is transmitting any more.

The noise level during the second to fifth time slot reduces the SNR of received satellite signals. The reduction of the SNR may degrade the performance of the GPS receiver 30, in case the SNR falls below a detection threshold.

In order to prevent such a performance degradation, the respective gain of the attenuation which is applied by the variable gain attenuator 33 of the GPS receiver 30 to received radio frequency signals is adjusted continuously. This adjustment is performed separately for internal and external interferences.

Whenever the GSM transceiver 40 of mobile station 22 is transmitting signals, the converters and DSP processing block 41 of the GSM transceiver 40 sets the amplification factors employed by the variable power amplifiers 42, 44 according to a power level requested by the base station to which mobile station 22 is currently connected. Moreover, the converters and DSP processing block 431 provides an information on the respectively used power level to the converters and DSP processing block 34 of the GPS receiver 30. If the GPS reception is switched on, the converters and DSP processing block 34 of the GPS receiver 30 then adjusts the gain of the variable gain attenuator 33 based on the received information. The actually applied attenuation in dBs can thereby be related to the incoming own interference level and the known antenna isolation.

More specifically, the gain of the variable gain attenuator 33 is set higher, the higher the power level which is used by the GSM transceiver 40 for transmitting signals. Thereby, in case of a lower noise level, stronger satellite signals reaching the GPS receiver 30, which have a sufficiently high SNR in spite of the noise, can still be evaluated, since the power level of the attenuated composite signal at point A of the GPS receiver 30 will still be sufficiently high for an evaluation. At the same time, weaker satellite signals reaching the GPS receiver 30 with an SNR which is too low for detection due to the noise, will not be evaluated, since the attenuated composite signal at point A of the GPS receiver 30 will have a power level which is too low for evaluation.

The information on the employed power level is provided by the GSM transceiver 40 either exactly at the respective times of transmission, or together with an extra timing information so that the GPS receiver 30 can attenuate received signals in any case at the correct times.

The attenuation of a signal received by the GPS receiver due to external interferences will be explained in the following with reference to the flow chart of FIG. 5.

When the GPS reception is switched on, an interference existence analysis is performed in the converters and DSP processing block 34 of the GPS receiver 30.

For the interference existence analysis, the converters and DSP processing block 34 first determines which time slot has the best SNR in the received GPS signals, and the power level of the corresponding signal is used as a reference signal level. When the power level of a signal reaching the converters and DSP processing block 34 exceeds this reference signal level, an external interference is assumed to be present in the corresponding time slots. A risen noise level due to transmissions by the GSM transceiver 40 of mobile station 22 is not detected, since the received signal is attenuated by the variable gain attenuator 33 during these transmissions as described above.

When the presence of an interference is detected, next a timing pattern is selected by the converters and DSP processing block 34 based on an exact timing information received from the converters and DSP processing block 41 of the GSM transceiver 40. The exact timing, including a timing advance, can be taken into account in the interference cancellation, since most probably, all interfering mobile stations 21 are connected to the same base station. Also the timing advance can be assumed to be the same, since the interfering mobile station 21 has to be close to the device 22.

In GSM, for example, moreover the received signal and transmitted signal timings are related to each other. Transmission and reception start timings are connected so that RX and TX slots have the same start time without TX timing advantage. If the accurate reception slot start time is known, then also possible transmission times are known due to the known shift of possible start times.

Figure 5:
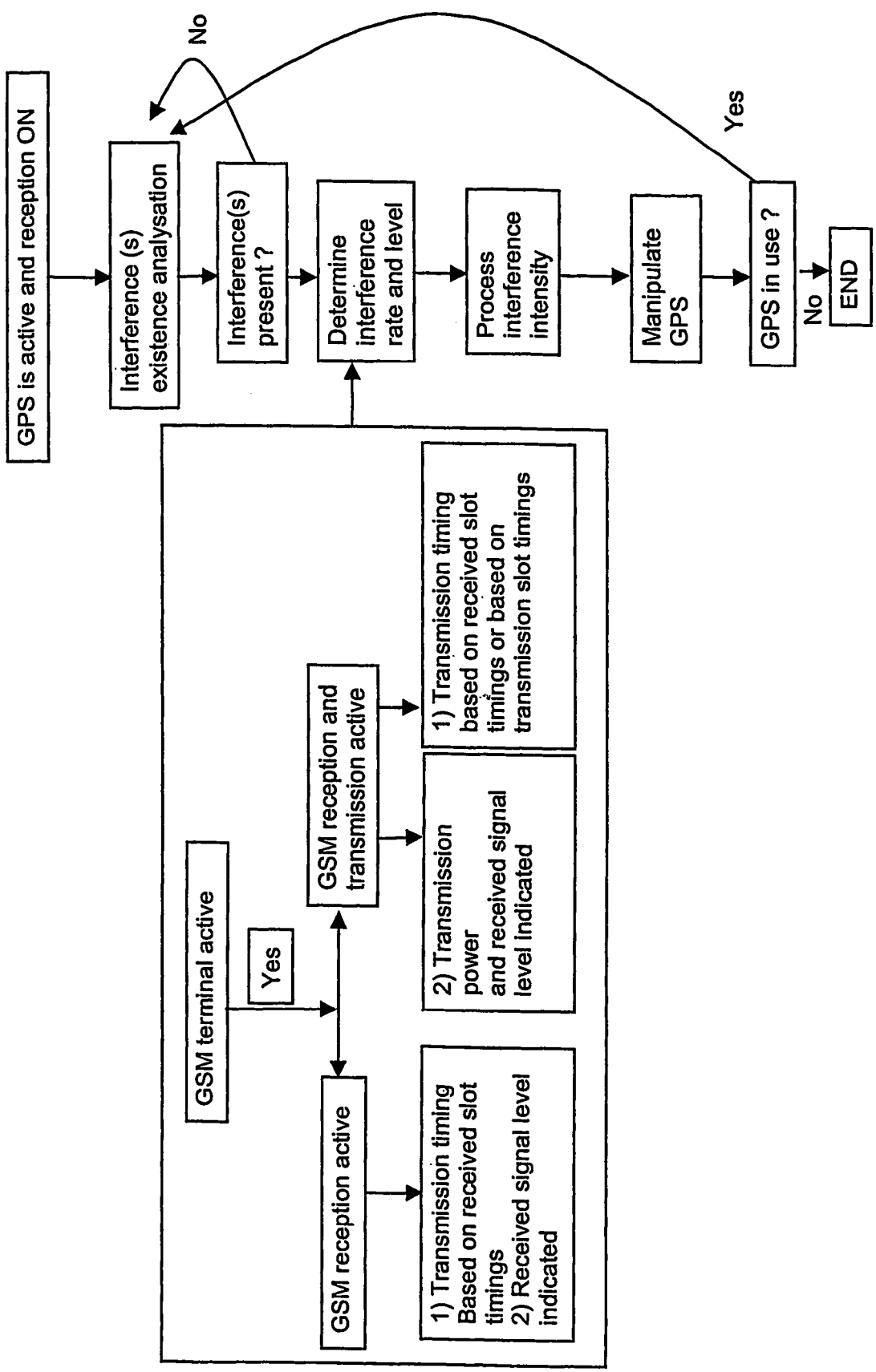
FIG. 5 is a flow chart illustrating a portion of an interference cancellation implemented in the mobile station of FIG. 3.

Therefore, as indicated in FIG. 5, if the GSM transceiver 40 is active, either a GSM reception or a GSM reception and transmission is active. If only GSM reception is active, the converters and DSP processing block 41 determines the transmission timing based on the timings of received slots and indicates the determined transmission timing to the converters and DSP processing block 34. In addition, the level of received signals is indicated to the converters and DSP processing block 34. If GSM reception and transmission is active, the converters and DSP processing block 41 determines the transmission timing either based on the timing of received slots or based on the transmission slot timing, and indicates the determined transmission timing to the converters and DSP processing block 34. In addition the transmission power and the received signal level is indicated to the converters and DSP processing block 34.

In the converters and DSP processing block 34, the times of the detected interference are compared to possible slot allocations. Due to the received exact timing information, the converters and DSP processing block 34 knows the exact position of the time slots, during which an expected interference can occur. The timing pattern thus corresponds to a sequence of specific time slots during which the interference is expected with the correct time of the time slots as used in the GSM system. In addition, the interference level is determined based on received GPS signals, on an indicated level of received GSM signals and possibly on the transmission power of the GSM transceiver 40.

When the best matching timing pattern is found, the current intensity of the interference is processed for determining a corresponding gain value. The gain can be determined more specifically by iterating the SNR of the received GPS signal, which decreases with an increasing interference level. Similarly as in the case of an internal interference, the gain of the variable gain attenuator 33 is selected the higher, the lower the SNR of a received signal. Based on the timing pattern and the determined gain, the GPS receiver 30 is manipulated. That is, the gain of the variable gain attenuator 33 is set by the converters and DSP processing block 34 to the determined value exactly during the correct time of the time slots identified by the timing pattern. In between, the gain is set to zero or to a value selected for canceling an internal interference. The gain is adjusted by the converters and DSP processing block 34 in a loop to correspond always to the current interference intensity, until the GPS reception is switched off again.

The processing according to the invention can be performed for instance by a software implemented in an existing DSP of the converters and DSP processing block 34. The processing could also be integrated into an existing GPS AGC functionality in this block 34 or external to this block 34. The gain determined in accordance with the invention as described above is then combined with the gain which is chosen based on other criteria. The processing according to the invention could also be performed by a dedicated component external to the GPS receiver chain. Further, some of the processing steps could also be taken care of by the GSM transceiver 40, e.g. by the converters and DSP processing block 41. In particular a, recognition of existing interference and a determination of a timing pattern could be performed by the GSM transceiver 40. Only the selected timing pattern could then be provided to the GPS receiver 30 for adjusting the gain according to the respective interference intensity with an accurate timing.

Summarized, the exact timing of noise can be provided by the GSM transceiver 40, since only certain transmission times are allowed in the GSM system, and the DSP of the GPS receiver 30 is used to optimize the determination of the start time of the noise under consideration of information on the exact timing received from the GSM transceiver 40.

Figure 6:
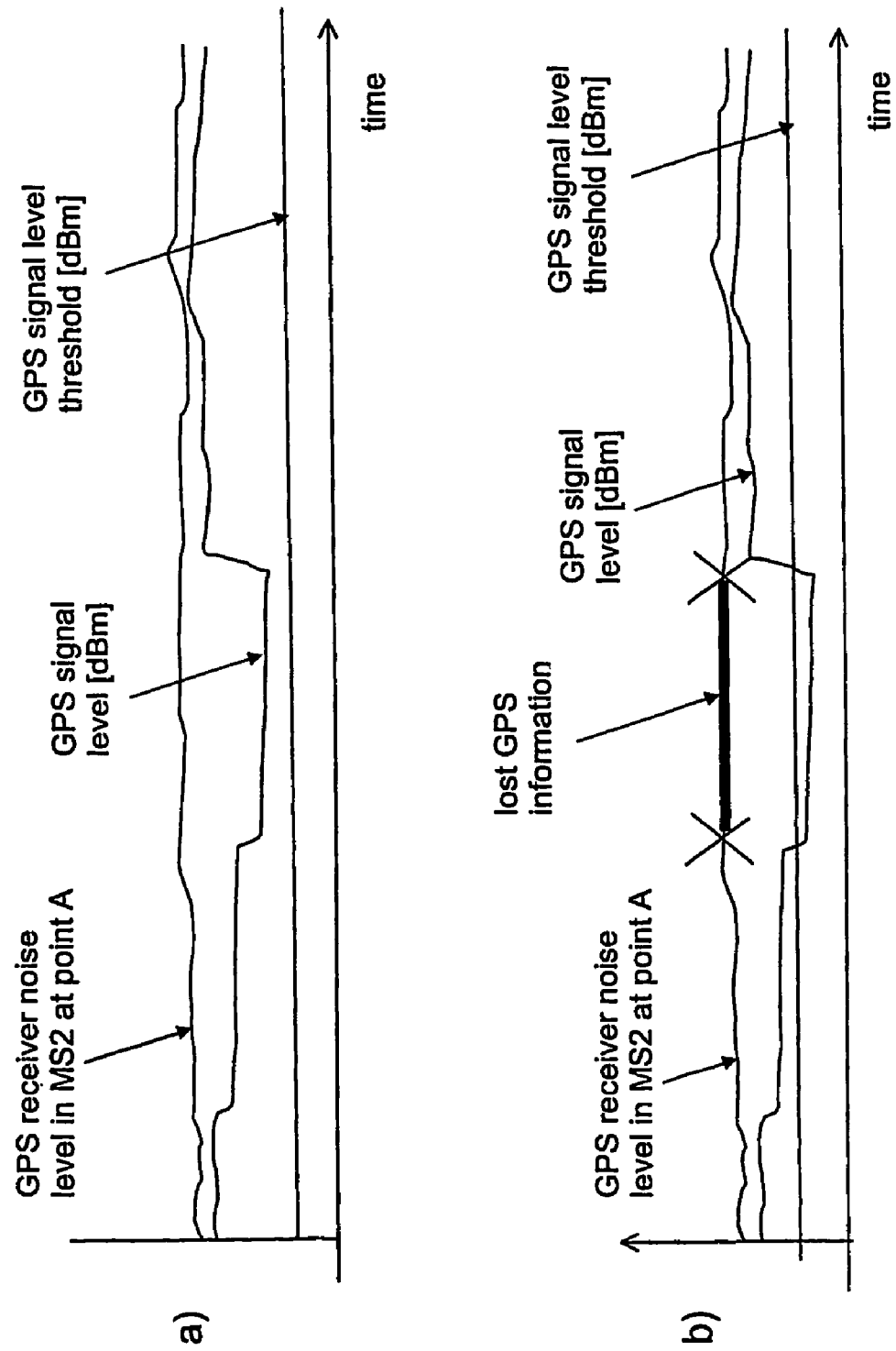
FIG. 6 illustrates the performance of the interference cancellation implemented in the mobile station of FIG. 3.

The result of the attenuation according to the invention is shown in FIGS. 6a and 6b.

Both figures depict the signal level in dBm of a GPS signal received by the GPS receiver 30 over time. The variations in the signal level correspond to the variations in the interference intensity shown in FIG. 4. In addition, a reception threshold for the GPS signal in dBm is shown. Only when the signal level of a received GPS signal lies above this threshold value can the signal be detected. In FIG. 6a, the signal level lies always above the threshold value, and thus the GPS information could be detected all the time in spite of interferences. In FIG. 6b, the signal level lies partly below the threshold value, more specifically during time slots four and five, during which a high internal interference is present. During these time slots, the signal cannot be detected.

Further, both figures depict the power level of the noise in a received GPS signal at point A of the GPS receiver 30 of FIG. 3 over time, when an attenuation according to the invention was applied by the variable gain attenuator 33.

The exactly timed attenuation reduces the noise level throughout to the thermal noise level. At the same time, the attenuation reduces the power level of the GPS signal. The GPS signal reaching the converters and DSP processing block 34 can only be evaluated, in case the power level of the signal is sufficiently high. Due to the attenuation with an adjustable gain, the power level of the signal reaching the converters and DSP processing block 34 will not be sufficiently high for an evaluation, whenever the signal level of the signal lies below the detection threshold value. Thus, in the situation of FIG. 6a, no GPS information is lost. In the situation of FIG. 6b, the GPS signal cannot be evaluated during the two time slots in which the signal cannot be detected due to the low GPS signal level. The GPS signal can therefore not be detected in as few situations as possible.

In an alternative to the presented approach, it would be possible to approximate the timing for the cancellation from measurement results. The accuracy in time with which a rise of the noise level is detected is related in this case to the rate of the noise measurements, though. In GSM transmissions, a transmission time slot only has a duration of 0.577 ms. Thus a noise level generated by GSM transmissions cannot be detected accurately with a measurement rate of e.g. every 1 ms. As a result, the interference cancellation is not able to work properly, i.e. the interference cancellation may begin and end too late. This means that sometimes, noise continues to disturb the operation of the GPS receiver, and sometimes, a good signal is prevented from being evaluated. Thus, also the GPS performance is fluctuating. In case of an external GSM transceiver using a single slot TX mode, the resulting performance degradation exceeds 0.6 dB due to the inaccurate timing. In order to achieve an accurate timing of the interference cancellation with this method, the repetition rate of the noise measurements would have to be much higher than ten times the rate of the transmission time slots in the communication system. Such, a high repetition rate of the measurements would increase the current consumption significantly. Moreover, such a high repetition rate of the measurements would occupy much processing time, and thus deteriorate the performance of the satellite positioning system.

With the proposed mobile station, the timing of GSM bursts can be known very accurately in the order of a few microseconds, without the necessity of a high rate of measurements. When a GSM noise attenuation is performed with this exact timing, also an existing GPS AGC can be maintained and the GPS performance degradation is minimal compared to a situation without interferences.

When the exact timing is known, in the worst case a theoretical degradation of 1.2 dB can occur with a two slot GSM transmission. This worst case is given when the external interference is causing during the respective two time slots all the time so much noise in the GPS frequency band that the SNR of a received GPS signal is during these time slots all the time below the detection threshold. If the interference level is low enough, in contrast, the performance degradation is approaching 0 dB.

A similar implementation as presented above for a device comprising a GSM transceiver and a GPS receiver could be used for a device comprising instead of the GPS receiver a DVB-T receiver.

Figure 7:
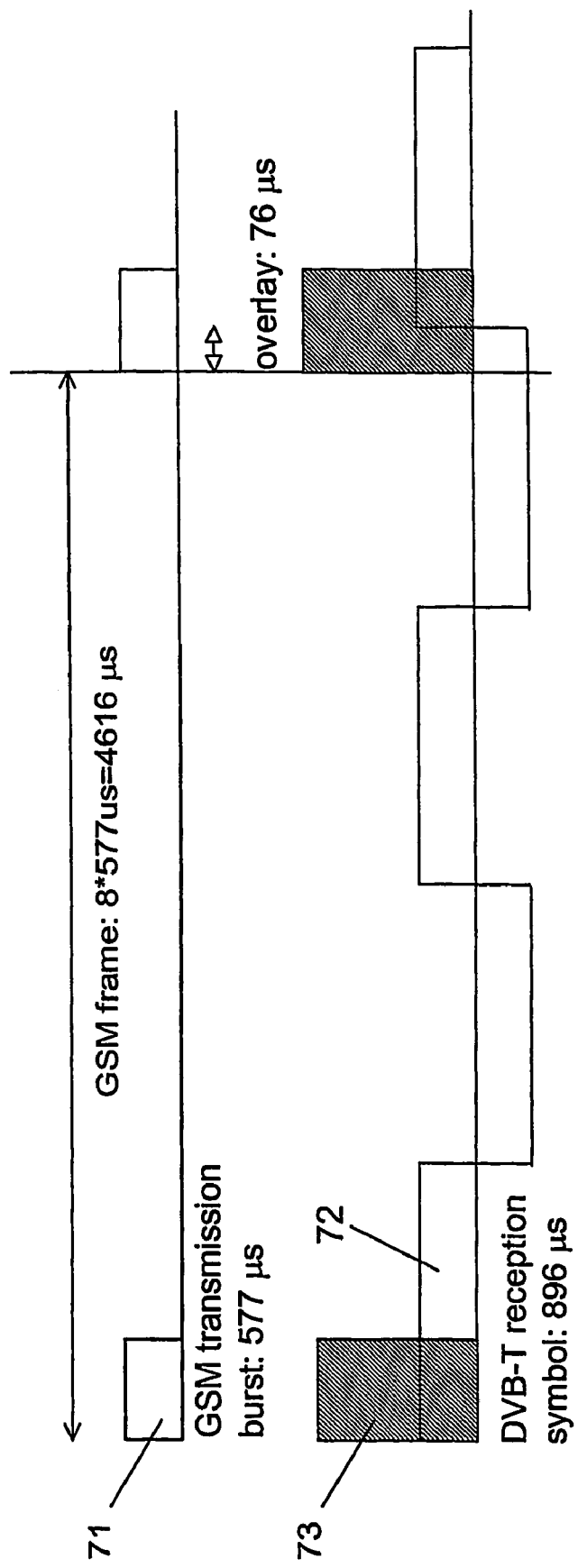
FIG. 7 illustrates the interference at a DVB-T receiver by a GSM system.

FIG. 7 is a time scale presentation of the problems a DVB-T receiver has with GSM bursts.

In the upper half of the FIG. 7, the occurrence of two GSM transmission bursts 71 is indicated over time. Each burst 71 has a duration of 577 μs. With a single slot TX mode, a bursts 71 of a specific GSM transceiver occurs once per GSM frame. A GSM frame comprises eight time slots and has thus a duration of 8*577 μs=4616 μs.

In the lower half of FIG. 7, DVB-T reception symbols 72 are indicated over time. Each symbol 72 has a duration of 896 μs.

The wideband noise generated by the GSM burst 71 overlays a DVB-T reception bit 72, and it starts, from one burst 71 to the next, to slide over the bit stream. Hatched boxed 73 show which part of a respective DVB-T reception bit 72 is corrupted by the GSM transmission. For the second burst 71, an overlay time of 76 μs is indicated.

When the DVB-T receiver is used instead of the GPS receiver in the mobile station of FIG. 3, the DVB-T receiver detects noise like interference having a cyclic pattern. The GSM transceiver reports possible transmission times to the DVB-T receiver, and received signals are only detected by the DVB-T receiver while no external interference is present. The times at which received signals can be detected is known from a timing pattern determined as described above with reference to FIG. 5.

If the DVB-T receiver knows the exact time when the bursts 71 of a GSM transmission will corrupt its reception, it can ignore that part of the respectively received bit 72. It may obtain nevertheless a correct information from the remaining uncorrupted bit 72, since the bit detection is carried out by integrating the input signal form and then comparing the integration result to a threshold value. The bit detection will thus work, even when the whole bit can not be integrated, as long as the SNR ratio is sufficiently high. If degraded bits 72 are ignored completely, in contrast, the probability to receive zero bits correctly is 50.8%, and the probability to receive every second bit correctly is 49.2%. It is not possible to receive all bits correctly.

It is to be noted that the described embodiment constitutes only one of a variety of possible embodiments of the invention.

The invention claimed is:

1. An apparatus comprising:
   a processor configured to detect presence of interfering signals in a second frequency band, wherein said second frequency band is used by a receiver to receive signals via a radio interface, and wherein said receiver is combined in a single device with a communication system transceiver exchanging signals via a radio interface in a first frequency band, and to determine a timing pattern for detected interfering signals based on a timing information provided by said communication system transceiver, which timing information is indicative of timing for transmissions employed by said communication system transceiver; and
   a processor configured to cause a manipulation of signals reaching said receiver during time intervals defined by a determined timing pattern, in order to reduce a performance degradation due to interfering signals originating from a transmitter external to said device, which transmitter employs a same timing for transmissions as said communication system transceiver of said device.

2. The apparatus according to claim 1, further comprising:
   said communication system transceiver; and
   said receiver.

3. The apparatus according to claim 2, wherein said processor configured to detect the presence of interfering signals in said second frequency band forms a part of said communication system transceiver.

4. The apparatus according to claim 2, wherein said processor configured to detect the presence of interfering signals in said second frequency band forms a part of said receiver.

5. The apparatus according to claim 2, wherein said receiver includes an attenuator, and wherein said processor configured to cause a manipulation of signals reaching said receiver is configured to cause said manipulation by varying an attenuation applied by said attenuator based on said timing pattern for attenuating signals received by said receiver.

6. The apparatus according to claim 5, wherein said processor configured to cause a manipulation of signals reaching said receiver is configured to set said attenuation higher as an intensity of detected interfering signals becomes higher.

7. The apparatus according to claim 2, wherein said receiver is one of a satellite positioning system receiver and a digital video broadcast-terrestrial receiver.

8. The apparatus according to claim 1, wherein said processor configured to cause a manipulation of signals reaching said receiver is configured to cause said manipulation by causing a blocking of a reception of said signals based on said timing pattern.

9. The apparatus according to claim 1, wherein said processor configured to cause a manipulation of signals reaching said receiver is configured to cause said manipulation by causing a disregarding of said signals in an evaluation of said signals based on said timing pattern.

10. The apparatus according to claim 1, wherein said processor configured to cause a manipulation of signals reaching said receiver is configured to cause said manipulation by detuning said second frequency range.

11. The apparatus according to claim 1, wherein said processor configured to cause a manipulation of signals reaching said receiver is configured to cause a manipulation of signals reaching said receiver in time intervals during which said communication system transceiver of said device transmits signals at least with a certain power level, in order to reduce a performance degradation due to interfering signals originating from said communication system transceiver of said device.

12. The apparatus according to claim 1, wherein said apparatus is a mobile phone or a laptop.

13. A method comprising:
detecting presence of interfering signals in a second frequency band, wherein said second frequency band is used by a receiver to receive signals via a radio interface, and wherein said receiver is combined in a single device with a communication system transceiver exchanging signals via a radio interface in a first frequency band;
determining a timing pattern for detected interfering signals based on a timing information which is indicative of timing for transmissions employed by said communication system transceiver; and
manipulating signals reaching said receiver during time intervals defined by said timing pattern, in order to reduce a performance degradation due to interfering signals originating from a transmitter external to said device, which transmitter employs a same timing for transmissions as said communication system transceiver of said device.

14. The method according to claim 13, further comprising manipulating signals reaching said receiver during time intervals in which said communication system transceiver of said device transmits signals at least with a certain power level, in order to reduce a performance degradation due to interfering signals originating from said communication system transceiver of said device.

15. The method according to claim 13, wherein signals reaching said receiver are manipulated by applying an attenuation to signals received by said receiver.

16. The method according to claim 15, wherein said attenuation applied to signals reaching said receiver is made higher in correspondence to higher intensity of detected interfering signals.

17. The method according to claim 13, wherein signals reaching said receiver are manipulated by being blocked from reception by said receiver.

18. The method according to claim 13, wherein signals reaching said receiver are manipulated by being disregarded in an evaluation of signals in said receiver.

19. The method according to claim 13, wherein signals reaching said receiver are manipulated by detuning said second frequency range.

20. An apparatus comprising:
means for detecting presence of interfering signals in a second frequency band, wherein said second frequency band is used by a receiver to receive signals via a radio interface, and wherein said receiver is combined in a single device with a communication system transceiver exchanging signals via a radio interface in a first frequency band;
means for determining a timing pattern for detected interfering signals based on a timing information which is indicative of timing for transmissions employed by said communication system transceiver; and
means for manipulating signals reaching said receiver during time intervals defined by said timing pattern, in order to reduce a performance degradation due to interfering signals originating from a transmitter external to said device, which transmitter employs a same timing for transmissions as said communication system transceiver of said device.

* * * * *